United States Patent [19]

Nosker et al.

[11] 3,904,488

[45] Sept. 9, 1975

[54] TRUE REPLICATION OF SOFT SUBSTRATES

[75] Inventors: Richard William Nosker, Princeton; Leonard P. Fox, Cherry Hill, both of N.J.

[73] Assignee: RCA Corporation, New York, N.Y.

[22] Filed: Oct. 23, 1973

[21] Appl. No.: 408,751

Related U.S. Application Data

[63] Continuation of Ser. No. 245,659, April 19, 1972, abandoned.

[52] U.S. Cl. ...................... 204/5; 29/199; 204/38 B

[51] Int. Cl.$^{2}$ ........................ B01D 3/00; B01D 3/34

[58] Field of Search .................... 249/116, 135, 134; 29/196.6, 199; 425/385, 403, 810; 204/38 B, 41, 38 S, 5, 6, 20, 30; 117/71 M

[56] References Cited

UNITED STATES PATENTS

| | | | |
|---|---|---|---|
| 2,075,646 | 3/1937 | Hewitt | 204/5 |
| 2,530,842 | 11/1950 | Ruggieri | 204/5 |
| 3,227,634 | 1/1966 | Rinzema et al. | 204/5 |

FOREIGN PATENTS OR APPLICATIONS

| | | |
|---|---|---|
| 613,662 | 12/1948 | United Kingdom |
| 484,447 | 5/1938 | United Kingdom |

*Primary Examiner*—T. M. Tufariello
*Attorney, Agent, or Firm*—Glenn H. Bruestle; Birgit E. Morris

[57] ABSTRACT

Exact replication of soft substrates can be achieved by depositing, as by evaporating, a first thin layer of chromium followed by a thin layer of gold and then electroplating a layer of bright nickel. This combination of metals produces an exact replica of the soft substrate without stress or distortion and has utility in the preparation of a metal master for mass produced replicas having low noise.

4 Claims, No Drawings

TRUE REPLICATION OF SOFT SUBSTRATES

This is a continuation of application Ser. No. 245,659, filed Apr. 19, 1972, now abandoned.

This invention relates to a method for exactly replicating a soft substrate. More particularly, this invention relates to a method for exact replication in metal of a soft substrate having minute variations in the form of relief patterns corresponding to audio and video information thereon.

BACKGROUND OF THE INVENTION

Sound recordings are made by converting sound vibrations into surface deformities in a soft surface, such as a layer of lacquer on a metal disc. These deformities are then replicated in metal as by metal plating of the lacquer surface to form a stamping master from which a plurality of reproductions can be made.

A method of recording and playback of video information has recently been disclosed by Clemens in copending U.S. application Ser. No. 126,772 filed Mar. 22, 1971 now U.S. Pat. No. 3,842,194. According to this system an aluminum blank is coated with a lacquer, machined flat and a spiral groove cut into the lacquer. A metal replica is then prepared of the lacquer surface by chemical deposition of a silver layer and a backing layer. This metal replica is replicated to form a recording master having a spiral groove thereon. This recording master in turn is coated with photoresist and exposed to a scanning electron microscope which modulates the bottom of the spiral groove with the information to be recorded. The photoresist is then developed, whereupon the recorded information is in the form of geometric variations in the bottom of the groove.

A stamping master must then be fabricated from the developed recording master. A standard method of metal replication is to apply a layer of silver plate onto a soft surface followed by a low stress sulfamate nickel plate as a backing layer. According to the method of Clemens, an electroless nickel coating is deposited onto the surface of the recording master, and a final nickel plate backing layer plated onto the sulfamate nickel layer about 0.008 inch thick. The metal surface is separated from the photoresist layer and used as a metal replica for embossing or hot pressing duplicate recordings in thermoplastic discs. Alternatively, and preferably, the metal surface is passivated with a potassium dichromate or potassium permanganate solution and a thick nickel metal positive electroplated and used to make one or more negative nickel stampers, analogous to the phonograph record art.

Since present day video discs are cut to a pitch of about 2,000–4,000 grooves per inch having signal wavelengths about one micron in size, very exact replication of these grooves and the minute geometric variations in the bottom of these grooves must be obtained in order to be able to obtain commercial quality images during playback.

The metal replication techniques of the prior art, such as those described above, have proven unequal to this task, probably due to an initial deposit stress in the first layers of metal deposited which distort the soft substrates to be replicated, and to a tendency to plate through the soft layer, resulting in a deteriorated substrate and a roughened replica which causes distortions and undue noise in information signals.

SUMMARY OF THE INVENTION

It is an object of the present invention to provide a method for exact replication of soft substrates.

It is a further object to provide a method of exact metal replication of a lacquer surface.

It is another object to provide a method of exact metal replication of a developed photoresist surface for preparing metal masters for video discs.

Further objects will become apparent from the following detailed description thereof.

We have discovered that exact metal replication of a soft substrate, particularly of a soft substrate coating on a rigid base support, can be effected by vapor deposition of a metal layer onto the soft substrate followed by electrodeposition of a bright nickel layer thereon.

DETAILED DESCRIPTION OF THE INVENTION

According to a preferred embodiment of the invention, a soft substrate, such as a lacquer coating or a developed photoresist coating on a metal base is first coated with a very thin layer, generally at least 50 to about 500A in thickness, and preferably about 200A in thickness, of chromium, followed by a layer of gold which can be from about 100 to about 2000A in thickness and preferably is from about 300 to about 700A thick. Preferably, the combined layers of both these metals will be from 600–800A thick. If too little metal is applied, the surface will not be conductive enough for the subsequent bright nickel electrolytic plating step. If too much metal is applied, too much stress will build up in the deposit, causing distortions of the soft substrate and also causing separation between the soft substrate and the deposited metal. The chromium and gold are deposited on the soft substrate using conventional vapor deposition techniques.

The detailed discussion of the present process which follows is illustrated with reference to a video disc having a developed photoresist coating, but the process is generally applicable to the exact replication of any soft substrate.

A disc to be replicated, having a spiral groove and a developed photoresist coating thereon having a video information recorded in the form of geometric variations in the bottom of the groove, is placed in a vacuum chamber on a turntable which revolves at a suitable speed, as about 60 rpm. A source of the metals to be deposited, such as chromium and gold filaments or boats, are placed several inches from the disc. Suitable means for heating the metal sources, as electrical connectors, are also provided. Preferably, a removable shutter is placed between the disc and the metal sources. The chamber is evacuated and the temperature of the chromium is then increased to the sublimation temperature of the chromium, and the shutter opened. When the shutter is opened, the gold source is hot but not evaporating. The temperature of the gold source is increased as the chromium is being deposited and when the gold begins to evaporate, the chromium heater is shut off. The deposition of gold is continued until the desired thickness of gold has been deposited on the disc.

The disc is then removed from the vacuum chamber, placed in a shield which protects the sides and center of the disc and immersed in a plating tank for the deposition of bright nickel onto the gold layer. The bright nickel plating solution is also conventional and will be known to one skilled in the art. In addition to the nickel compounds, the plating solution can also contain boric acid, brighteners, anti-pitting agents and other conventional additives known to those skilled in this art.

Nickel plating is started slowly, since the chromium-gold coating is very thin and cannot carry a high current, but the plating rate can be increased as deposition of the bright nickel continues. Plating is continued until a layer of about 0.3 to about 2 mils in thickness, preferably about 1 mil, has been deposited. The thickness of the bright nickel layer must be sufficient to put down a rigid surface; however, to much nickel is to be avoided since undue stress will be built up, thereby distorting the surface variations of the soft substrate. When the desired amount of nickel has been deposited, the disc is removed from the bath, and rinsed with water.

As a final step, a standard backing layer of a metal, such as nickel or copper, generally 10 mils thick or more, is applied to the disc.

The process of this invention provides a base for electroplating the backing layer which is smooth and true. The chromium-gold deposition will not interact with a metal base beneath the soft substrate, which is of particular advantage when the soft substrate is thin, such as a photoresist layer. Further, the bright nickel electroplate forms a relatively strong, rigid replica of the soft surface without introducing surface roughness generated by standard audio techniques, which causes noise in the final replica.

The invention will be further illustrated by the following examples but it is to be understood that the invention is not meant to be limited to the details described therein.

EXAMPLE 1

A fourteen inch disc having a spiral groove thereon cut with a pitch of about 4,000 grooves per inch was coated with photoresist and exposed to a scanning electron microscope corresponding to a source of video information. The resist was developed by standard methods.

The disc was placed on a turntable in a vacuum chamber fitted with two chromium filaments aligned parallel to and about 4 inches away from the disc, and two gold boats, also placed about 4 inches away from the disc and at about 2 inches and 6 inches from the center of the disc respectively. The chromium and the gold sources were connected to a source of current. A shutter was also placed between the disc and the metals. The chamber was evacuated, and the chromium filaments heated to about 1,100°F. when the shutter was opened. Heating was continued for about one-half minute until the gold deposition had begun. Then the chromium was shut off. Gold deposition was continued for between three and four minutes. The disc was then removed from the chamber and had a chromium layer about 200A thick and a gold layer about 500A thick. The surface appeared perfectly smooth and free of graininess.

The disc was placed in a shield and immersed in a bright nickel plating bath charged with 250 lbs. of nickel sulfate, 50 lbs. of nickel chloride, 37 lbs. of boric acid, four gallons of a primary brightener available as P-252 from the McGean Chemical Company, 0.6 quart of McGean's secondary brightener S-251 and 0.3 quart of McGean's anti-pitting agent nonfoam 30, dissolved in 100 gallons of water. The temperature of the bath was brought to 130°F and 5 amps/sq. ft. of current started. The current was brought up to about 20 amps/sq. ft. over about a fifteen minute period. When a one mil thick layer of bright nickel had been deposited on the disc, the disc was removed from the bath and rinsed with water.

The disc was finally charged to a standard nickel sulfamate plating bath at 110°F. A current of 70 amps/sq. ft. was maintained until a layer of nickel about 10 mils in thickness had been deposited on the disc.

The chromium, gold, bright nickel and sulfamate nickel replica was separated from the recording master and examined for surface roughness. The surface was completely smooth, that is, any surface variations were less than 30A deep, the limit of detection of the available equipment.

High quality vinyl replicas were prepared from this master disc.

EXAMPLE 2

A fourteen inch aluminum blank having a recording lacquer coating thereon about 0.007 inch thick was machined flat to ±0.0001 inch and a spiral groove was cut into the lacquer with a pitch of about 4,000 grooves per inch.

A chromium, gold, bright nickel, sulfamate nickel replica was made following the procedure of Example 1, and compared with a silver- nickel replica made following the procedure disclosed in aforementioned U.S. Pat. No. 3,842,194.

The replica made according to the present invention had a surface roughness one-fifth that of the comparison replica in the wavelength range 2 milliinches (5.08 $\times 10^{-3}$ cm.) or greater.

We claim:

1. A method of replicating a recording master having a developed resist coating thereon which comprises
   a. vapor depositing a first layer of chromium from about 50–500 Angstroms thick on the resist,
   b. vapor depositing a second layer of gold from about 100–2,000 Angstroms thick on the first layer, and
   c. electrolytically depositing a third layer of bright nickel from about 0.3-2 mils thick on the second layer so as to form a stress-free replica.

2. A method according to claim 1 wherein a fourth backing layer is electrolytically deposited on the third layer.

3. A method according to claim 1 wherein the layer of gold is from about 300 to about 700 Angstroms thick.

4. A method according to claim 1 wherein the combined layers of chromium and gold are from about 600 to about 800 Angstroms thick.

* * * * *